United States Patent
Inoue et al.

(10) Patent No.: US 7,182,990 B2
(45) Date of Patent: Feb. 27, 2007

(54) OPTICAL INFORMATION RECORDING MEDIUM

(75) Inventors: Hiroyasu Inoue, Tokyo (JP); Koji Mishima, Tokyo (JP); Masaki Aoshima, Tokyo (JP); Hideki Hirata, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 105 days.

(21) Appl. No.: 10/896,051

(22) Filed: Jul. 22, 2004

(65) Prior Publication Data

US 2005/0018590 A1 Jan. 27, 2005

(30) Foreign Application Priority Data

Jul. 23, 2003 (JP) ............................. 2003-200199

(51) Int. Cl.
*B32B 3/02* (2006.01)
*G11B 13/00* (2006.01)

(52) U.S. Cl. ................... 428/64.4; 428/64.2; 428/64.6; 369/275.2

(58) Field of Classification Search ............... 428/64.2, 428/64.4, 64.6; 369/275.2
See application file for complete search history.

(56) References Cited

U.S. PATENT DOCUMENTS

| 5,912,104 | A * | 6/1999 | Hirotsune et al. | ..... 430/270.13 |
| 6,996,055 | B2 | 2/2006 | Mishima et al. | |
| 2003/0231577 | A1 * | 12/2003 | Mishima et al. | ............ 369/283 |
| 2004/0076907 | A1 * | 4/2004 | Inoue et al. | ........... 430/270.12 |
| 2004/0152016 | A1 * | 8/2004 | Mishima et al. | ....... 430/270.12 |
| 2004/0157158 | A1 * | 8/2004 | Kakiuchi et al. | ...... 430/270.12 |
| 2004/0174796 | A1 * | 9/2004 | Mizushima et al. | .......... 369/94 |
| 2004/0174804 | A1 * | 9/2004 | Kakiuchi et al. | ........ 369/275.4 |

FOREIGN PATENT DOCUMENTS

| JP | 62-204442 | 9/1987 |
| JP | 2003-302339 | 10/2003 |

OTHER PUBLICATIONS

English Language Abstract of JP 62-204442.
English Language Abstract of JP 2003-302339.
U.S. Appl. No. 10/896,110, filed Jul. 22, 2004, Inoue et al.
U.S. Appl. No. 10/896,117, filed Jul. 22, 2004, Inoue et al.
U.S. Appl. No. 10/923,665, filed Aug. 24, 2004, Inoue et al.
U.S. Appl. No. 10/923,666, filed Aug. 24, 2004, Inoue et al.
U.S. Appl. No. 10/923,673, filed Aug. 24, 2004, Inoue et al.
U.S. Appl. No. 10/923,674, filed Aug. 24, 2004, Inoue et al.
U.S. Appl. No. 10/923,679, filed Aug. 24, 2004, Inoue et al.
U.S. Appl. No. 10/923,682, filed Aug. 24, 2004, Inoue et al.
U.S. Appl. No. 10/923,699, filed Aug. 24, 2004, Inoue et al.

* cited by examiner

*Primary Examiner*—Rena Dye
*Assistant Examiner*—Lawrence Ferguson
(74) *Attorney, Agent, or Firm*—Greenblum & Bernstein, P.L.C.

(57) ABSTRACT

An optical information recording medium which makes it possible to reduce the noise level and improve the C/N ratio. An optical information recording medium has a recording layer formed on a substrate, for having a laser beam irradiated thereto for recording and reproducing record data. The recording layer includes a first sub-recording film and a second sub-recording film. The first sub-recording film is formed of a first material containing Si as a main component. The second sub-recording film is formed of a second material containing Zn as a main component and having Al added thereto, and disposed in the vicinity of the first recording film. The laser beam is irradiated to the recording layer via a light transmitting layer formed in a manner covering the recording layer.

5 Claims, 2 Drawing Sheets

OPTICAL INFORMATION RECORDING MEDIUM

BACKGROUND OF THE INVENTION

1. Field of the Invention

The present invention relates to an optical information recording medium configured to be capable of recording and reproducing record data by irradiating a laser beam to a recording layer formed on a substrate.

2. Description of the Related Art

As an optical information recording medium of this kind, the present assignee has proposed a single-sided write-once optical information recording medium in Japanese Patent Application No. 2002-105994. The optical information recording medium is comprised of a substrate formed of a polycarbonate or the like by an injection molding method, and a reflective layer, a recording layer, a protective layer, and a covering layer, deposited on the substrate. The reflective layer reflects a laser beam irradiated from the covering layer side when record data is recorded and reproduced, and is in the form of a thin film made of a metal, such as Au, Ag, or Al, or a mixture of selected ones of these metals. The recording layer is provided in a manner sandwiched between a first protective film and a second protective film constituting the protective layer. The recording layer is formed by sequentially depositing a second sub-recording film and a first sub-recording film on the second protective film in the mentioned order. In this case, the first sub-recording film is formed of a highly reflective metal, such as Al, Cu, Ag, or Au, and the second sub-recording film is formed of a reactive metal, such as Sn, Te, Sb, Ge, Si, or C, or a semimetal. On the other hand, the first and second protective films (dielectric layers) of the protective layer prevent oxidation of the sub-recording films during irradiation of the laser beam, and deformations of the substrate and the covering layer, and is formed of a dielectric material, such as $ZnS+SiO_2$. The covering layer (light-transmitting layer) is formed of e.g. a light-transmitting resin applied by spin-coating, and provides an optical path of the laser beam while preventing the layers on the substrate from being scratched.

In recent years, optical information recording media are desired to have the capability of recording and reproducing a large amount of record data at a high speed (in a short time period). Accordingly, the optical information recording medium of the above-mentioned kind is required to enhance recording density of record data, and to meet the requirement, the diameter of a beam spot of a laser beam used for recording or reproduction of record data tends to be reduced. More specifically, record data are recorded and reproduced using a pickup which is equipped with an objective lens having a numerical aperture (NA) of not less than 0.7 (e.g. a numerical aperture (NA) of approximately 0.85), and is capable of emitting a laser beam having a wavelength ($\lambda$) of not more than 450 nm (e.g. a wavelength ($\lambda$) of approximately 405 nm). However, as the numerical aperture (NA) is larger, the allowable angle range (i.e. tilt margin) of the optical axis of the laser beam with respect to the optical information recording medium becomes smaller. Therefore, in the case of the construction of the optical information recording medium, such as a conventional general type, in which the laser beam emitted from the pickup is irradiated through the substrate to the recording medium, the substrate has a rather large thickness of e.g. approximately 1 mm, and therefore it is difficult to obtain a desired tilt margin. To overcome this problem, the optical information recording medium proposed by the present assignee employs the construction which allows the laser beam to be irradiated through the covering layer having a thickness of approximately 100 μm, which is formed in a manner covering the recording layer, to the recording layer, whereby a tilt margin is obtained which is large enough to stably record and reproduce record data. In this case, to suppress coma of the laser beam as well, it is preferable to reduce the thickness of the covering layer (e.g. to a value of e.g. 100 μm).

To record data on the optical information recording medium (forming pits according to contents of record data), a laser beam adjusted to a recording power is irradiated to the recording layer. The irradiation of the laser beam causes the two sub-recording films to be mixed with each other (atomic arrangement thereof to be changed) to form recorded portions (pits). On the other hand, to reproduce the record data recorded on the optical information recording medium (determine whether or not each pit exists), a laser beam adjusted to a reproducing power is irradiated to the recording layer. The recorded portion and the unrecorded portion are different in optical constant therebetween, so that the irradiation of the laser beam to these portions reveals different values of reflectance thereof. Therefore, by detecting the difference, it is possible to determine the existence of each pit in the recording layer (whether or not the pit exists in the recording layer) to thereby reproduce the record data.

Figure 4:
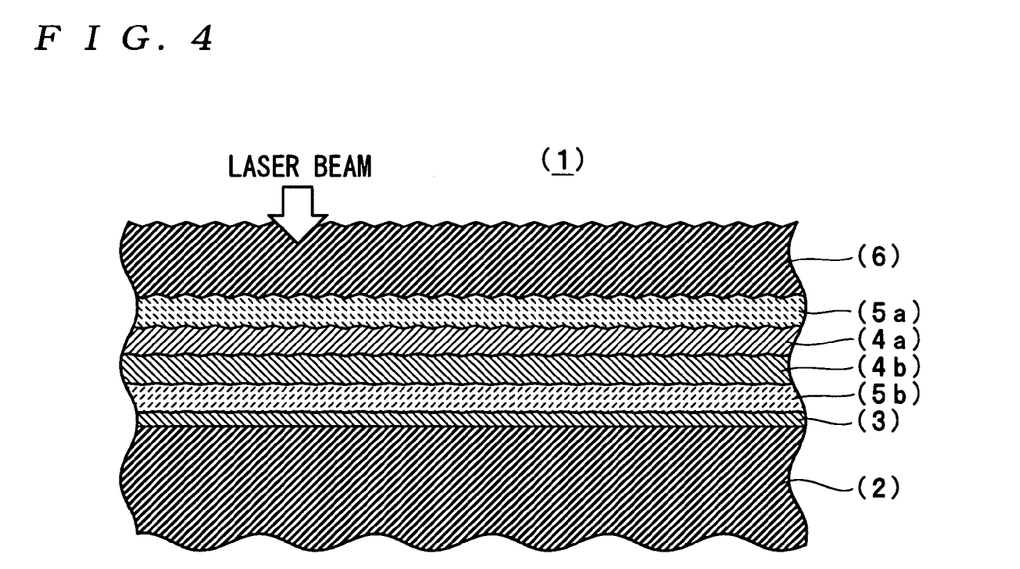
FIG. 4 is a cross-sectional view showing the arrangement of an optical information recording medium proposed by the present assignee.

The present inventors have studied the above-described optical information recording medium, and found the following points to be improved: The optical information recording medium employs the construction which allows the laser beam to be irradiated through the covering layer formed in a manner covering the recording layer, to the recording layer. In this case, when the optical information recording medium is produced, there are the reflective layer, the second protective layer, the second sub-recording film, the first sub-recording film, the first protective layer, and the covering layer, sequentially deposited on the substrate in the mentioned order. In this case, as shown in FIG. 4, the reflective layer (3) formed on the substrate (2) which is formed such that the surface of each guide track (upper surface of land and bottom surface of groove: upper surface of the substrate (2) as viewed in FIG. 4) is flat has a slightly rough surface compared with the surface of the substrate (2). It should be noted that in FIG 4, the guide track (groove and land) is omitted from illustration for ease of understanding the multilayer structure. Further, the second protective layer (5b) formed on the slightly rough surface of the reflective layer (3) has a rougher surface than that of the reflective layer (3). Therefore, after the layers i.e. the reflective layer (3) to the covering layer (6), are sequentially deposited, the surface of each layer becomes rougher as the layer is more distant from the substrate (2) (i.e. as closer to incidence plane of the laser beam). The FIG. 4 shows the progressively roughened conditions of the respective surfaces of the layers in an exaggerated manner for purposes of illustration.

In the above case, when the upper surface of the second protective layer (5b) (interface between the second protective film (5b) and the second sub-recording film (4b)), the upper surface of the second sub-recording film (4b) (interface between the second sub-recording film (4b) and the first sub-recording film (4a)), and the upper surface of the first sub-recording film (4a) (interface between the first sub-recording film (4a) and the first protective film (5a)) are significantly rough, the level of noise contained in a reproduction signal (noise level) is high, so that the C/N ratio is lowered. Particularly, in the case of the optical information recording medium (1) of a type to which a laser beam having a short wavelength is emitted from an objective lens having a large numerical aperture to record and reproduce record data, the laser beam irradiated to the sub-recording films (4a and 4b) forms a beam spot having a very small diameter, so that the surface smoothness of the second sub-recording film (4b) has large influence on the noise level of the reproduction signal and the value of the C/N ratio. Therefore, depending on the reproduction speed, it can be difficult to accurately read record data recorded on the optical information recording medium (1), since the surface of each layer thereof tends to be formed to be rougher as the layer is closer to the incidence plane of the laser beam. To overcome this problem, it is desirable to reduce the noise level and improve the C/N ratio.

SUMMARY OF THE INVENTION

The present invention has been made to solve the problems described above, and a main object thereof is to provide an optical information recording medium which makes it possible to reduce the noise level and improve the C/N ratio.

To attain the above object, the present invention provides an optical information recording medium for recording and reproducing record data, comprising a substrate, a recording layer formed on the substrate, for having a laser beam irradiated thereto for recording and reproduction of the record data, and a light transmitting layer formed in a manner covering the recording layer, wherein the recording layer includes a first recording film formed of a first material containing Si as a main component, and a second recording film formed of a second material containing Zn as a main component and having Al added thereto, the second recording film being formed in the vicinity of the first recording film, and wherein the laser beam is irradiated to the recording layer from a light transmitting layer side. It should be noted that in the present invention, the term "main component" is intended to mean a component which has the largest composition ratio (at %: atomic percentage) of a plurality of elements constituting a material for forming a film or a layer.

With the arrangement of this optical information recording medium, the first recording film is formed by using a first material containing Si as a main component, and the second recording film is formed in the vicinity of the first recording film by using a second material containing Zn as a main component and having Al added thereto. The addition of Al makes it possible to improve the smoothness of the surface of the second recording film, thereby significantly lowering the noise level. Therefore, the C/N ratio can be enhanced, whereby record data can be reliably reproduced.

Preferably, the second material has Al added thereto in an amount not less than 9 at % and less than 50 at % to thereby form the second recording film. With this arrangement of the preferred embodiment, it is possible to sufficiently lower the noise level in a frequency band which is of interest in the use of the present optical information recording medium. This makes it possible to provide an optical information recording medium capable of reliably reproducing record data.

More preferably, the second material has Al added thereto in an amount not less than 16.5 at % and less than 50 at % to thereby form the second recording film. With this arrangement of the preferred embodiment, it is possible to further reduce the noise level, so that record data can be more reliably reproduced.

Preferably, the recording layer is configured such that the first and second recording films are in contact with each other. With this arrangement of the preferred embodiment, when the laser beam adjusted to a recording power is irradiated to the recording layer, the first and second recording films can be easily mixed with each other to thereby form the recorded portion.

Preferably, the recording layer is formed such that a total of a thickness of the first recording film and a thickness of the second recording film is not less than 2 nm and not more than 30 nm. With this arrangement of the preferred embodiment, the C/N ratio can be fully enhanced, whereby record data can be reliably reproduced.

Preferably, the optical information recording medium includes a first dielectric layer formed between the light transmitting layer and the recording layer, and a second dielectric layer formed between the substrate and the recording layer. With this arrangement of the preferred embodiment, it is possible to configure the recording layer to be sandwiched between the first and second dielectric layers, and therefore, it is possible to prevent thermal deformations of the substrate and the light transmitting layer during irradiation of the laser beam (during formation of the recorded portion). Further, since corrosion of the recording layer can be prevented, it is possible to store record data for a long time period in a manner such that the recorded data can be normally reproduced.

More preferably, the optical information recording medium includes a reflective layer formed between the substrate and the second dielectric layer. With this arrangement of the preferred embodiment, since the effect of multi-beam interference is further increased, it is possible to further increase the difference in optical reflectance between the recorded portion and the unrecorded portion, whereby record data can be more reliably reproduced.

It should be noted that the present disclosure relates to the subject matter included in Japanese Patent Application No. 2003-200199 filed on Jul. 23, 2003, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENT

The invention will now be described in detail with reference to the accompanying drawings showing a preferred embodiment thereof.

First, a description will be given of the construction of an optical information recording medium 1 according to the present invention.

Figure 1:
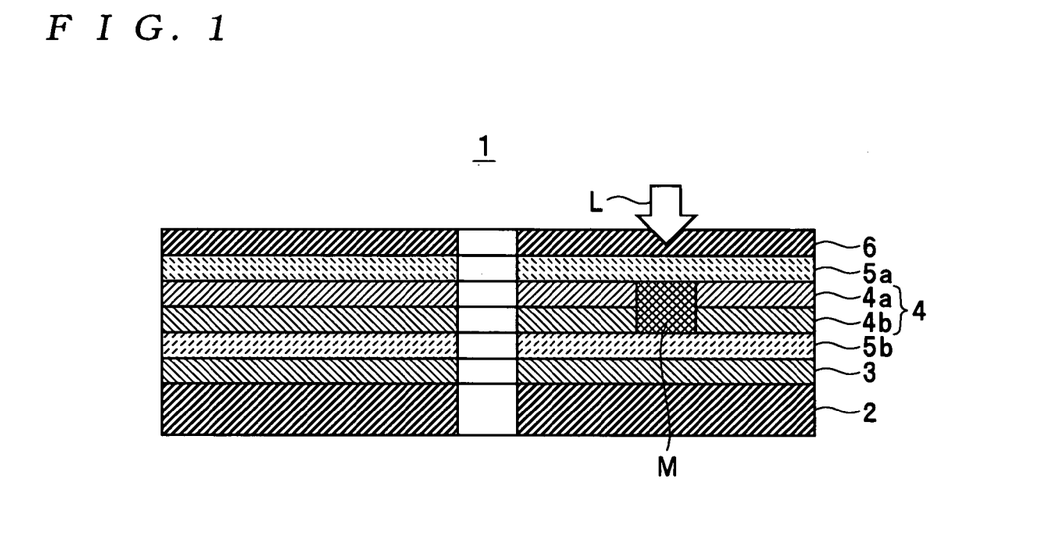
FIG. 1 is a cross-sectional view showing the construction of an optical information recording medium according to an embodiment of the present invention.

The optical information recording medium 1 is a single-sided single-layered optical disk of a write-once type, having an outer diameter of approximately 120 mm and a thickness of 1.2 mm, and configured to be capable of recording and reproducing record data, using a blue-violet laser beam (hereinafter referred to as the "laser beam") L having a wavelength ($\lambda$) not less than 380 nm and not more than 450 nm (e.g. 405 nm), emitted from an objective lens having a numerical aperture (NA) of not less than 0.7 (e.g. approximately 0.85). More specifically, as shown in FIG. 1, the optical information recording medium 1 is comprised of a reflective layer 3, a second dielectric layer 5b, a recording layer 4, a first dielectric layer 5a, and a light transmitting layer 6, sequentially deposited on the substrate 2 in the mentioned order. Further, the optical information recording medium 1 has a central portion thereof formed with a central hole for mounting (cramping) the same on a recording/reproducing apparatus.

The substrate 2 is in the form of a disk with a thickness of approximately 1.1 mm, made e.g. of a polycarbonate resin by the injection molding method. In this case, the substrate 2 can also be formed by any suitable one of various substrate-forming methods, such as the 2P method. Further, one surface (upper surface as viewed in FIG. 1) of the substrate 2 is formed with grooves and lands extending helically from a central portion of the substrate 2 toward the outer periphery thereof. In this case, the grooves and the lands function as guide tracks for recording and reproduction of data on and from the recording layer 4. Therefore, to enable accurate tracking to be performed, it is preferable to form grooves between the lands, for example, such that they have a depth not less than 10 nm and not more than 40 nm, and a pitch not less than 0.2 μm and not more than 0.4 μm. Further, the optical information recording medium 1 is configured such that the laser beam L is to be irradiated thereon from the light transmitting layer 6 side when data is recorded or reproduced. Therefore, the substrate 2 is not required to have a light transmitting property, i.e. be transparent, so that the optical information recording medium 1 has more options for selecting materials for forming the substrate 2 than the existing general optical information recording media (e.g. CD-R). More specifically, the material for forming the substrate 2 is not limited to the above-mentioned polycarbonate resin, but resin materials, such as an olefin resin, an acrylic resin, an epoxy resin, a polystyrene resin, a polyethylene resin, a polypropylene resin, a silicone resin, a fluorocarbon resin, an ABS resin, and an urethane resin, as well as glass and ceramic materials can be employed as the substrate-forming material. However, it is preferable to employ resin materials that are easy to mold and relatively inexpensive, such as the polycarbonate resin and the olefin resin.

The reflective layer 3 reflects the laser beam L irradiated thereon via the light transmitting layer 6 when recorded data is reproduced, and is made of any of metal materials, such as Mg, Al, Ti, Cr, Fe, Co, Ni, Cu, Zn, Ge, Ag, Pt, and Au, or alloys containing selected ones of them (e.g. AgNdCu=98:1:1, and AgPdCu=98:1:1) such that it has a thickness not less than 10 nm and not more than 300 nm. In this case, to reflect the necessary and sufficient amount of the laser beam L, it is preferable to define the thickness of the reflective layer 3 to be not less than 20 nm and not more than 200 nm (e.g. 100 nm). Further, metal materials, such as, Al, Au, Ag, Cu, and the metal materials such as an alloy of Ag and Cu, have a high reflectance, and therefore it is preferable to use metal materials containing at least one of these metals as the material for forming the reflective layer 3.

The first dielectric layer 5a and the second dielectric layer 5b (also referred to as the "dielectric layers 5" when they are not distinguished from each other) correspond to first and second dielectric layers in the present invention, respectively, and are formed such that they sandwich the recording layer 4. The dielectric layers 5 prevent (reduce) corrosion of the recording layer 4, thereby preventing degradation of recorded data, and at the same time prevent thermal deformations of the substrate 2 and the light transmitting layer 6 during recording of record data to thereby prevent deterioration of jitter characteristics. Further, the dielectric layers 5 also serve to increase the amount of change in the optical characteristics between a recorded portion having record data recorded thereon (portion of the recording layer, having pits formed thereon) and an unrecorded portion having no record data recorded thereon (portion of the recording layer, having no pits formed thereon) by the effect of multi-beam interference. In this case, to increase the amount of change in the optical characteristics, it is preferable to form the dielectric layers 5 using a dielectric material having a high index of refraction (n) in the wavelength region of the laser beam L. Further, when the laser beam L is irradiated, if an excessively large amount of energy is absorbed by the dielectric layers 5, recording sensitivity of the recording layer 4 is reduced. Therefore, it is preferred to form the dielectric layers 5 using a dielectric material having a small extinction coefficient (k) in the wavelength region of the laser beam L to thereby prevent the reduction of the recording sensitivity.

More specifically, from the viewpoint of prevention of thermal deformations of the substrate 2 and the light transmitting layer 6, and enhancement of protecting characteristics of the dielectric layers 5 for protecting the recording layer 4 as well as obtaining the effect of multi-beam interference, it is preferable to employ a dielectric material having a light transmitting property, such as any of $Al_2O_3$, AlN, ZnO, ZnS, GeN, GeCrN, $CeO_2$, SiO, $SiO_2$, $Si_3N_4$, SiC, $La_2O_3$, TaO, $TiO_2$, SiAlON (mixture of $SiO_2$, $Al_2O_3$, $Si_3N_4$, and AlN), and LaSiON (mixture of $La_2O_3$, $SiO_2$, and $Si_3N_4$), any of oxides, nitrides, sulfides, and carbides of Al, Si, Ce, Ti, Zn, and Ta, and mixtures thereof, as the dielectric material for forming the dielectric layers 5. In this case, the first dielectric layer 5a and the second dielectric layer 5b can be formed of the same dielectric material, or alternatively by respective dielectric materials different from each other. Further, one or both of the first dielectric layer 5a and the second dielectric layer 5b can be configured to have a multilayer structure formed by a plurality of dielectric layers.

In the optical information recording medium 1 according to the present invention, the first dielectric layer 5a and the second dielectric layer 5b are formed of a dielectric material mainly composed of a mixture of ZnS and $SiO_2$ (preferably, molar ratio of ZnS:$SiO_2$=80:20), such that they have a thickness not less than 10 nm and not more than 200 nm (e.g. 25 nm). In this case, the mixture of ZnS and $SiO_2$ has a high index of refraction (n), and a relatively small extinction coefficient (k) with respect to the laser beam L in the wavelength region ranging from 380 nm to 450 nm inclusive, which causes a more conspicuous change in optical characteristics of the recording layer 4 before and after recording of data thereon, and at the same time prevents the recording sensitivity thereof from being degraded. Further, the thickness of each of the first and second dielectric layers 5a and 5b is not limited to the examples described above, but when the dielectric layer has a thickness of less than 10 nm, it is difficult to obtain the aforementioned effects. Inversely, when the dielectric layer has a thickness of more than 200 nm, it takes a long time to deposit the dielectric layer, which can sharply increase the manufacturing costs of the optical information recording medium 1, and further cause cracks in the optical information recording medium 1 due to stress within the first dielectric layer 5a or the second dielectric layer 5b. Therefore, it is preferable to define the thicknesses of the first and second dielectric layers 5a and 5b to be not less than 10 nm and not more than 200 nm.

The recording layer 4 has optical characteristics thereof changed by the laser beam L irradiated thereto during recording of record data so as to be formed with recorded portions M (pits). The recording layer 4 is formed by two thin films, i.e. a second sub-recording film 4b and a first sub-recording film 4a, sequentially deposited on the substrate 2 in the mentioned order. In this case, the recording layer 4 is formed such that the two thin films are deposited in the order of the first sub-recording film 4a and the second sub-recording film 4b from the light transmitting layer 6 side (side closer to the incidence plane of the laser beam L). This enables the optical characteristics of the recording layer 4 to be sufficiently changed even with the laser beam L relatively small in power, thereby making it possible to reliably form the recorded portions M. The first sub-recording film 4a corresponds to a first recording film according to the present invention, and is in the form of a thin film made of a material (first material in the present invention) containing Si as a main component. By forming the first sub-recording film 4a using the material containing Si as the main component, it is possible to fully enhance the C/N ratio of a reproduction signal, as will be described hereinafter. In the embodiment of the present invention, the atomic percentage of Si to the whole material for forming the first sub-recording film 4a is defined to be not lower than 95 at % (e.g. 99 at %)

Further, the second sub-recording film 4b corresponds to a second recording film according to the present invention, and is in the form of a thin film made of a material (second material in the present invention) containing Zn as a main component and having Al added thereto. In this case, since Zn is inexpensive, it is possible to fully reduce the manufacturing costs of the optical information recording medium 1. In contrast, when the second sub-recording film 4b is formed using a material in which no Al or the like is added to Zn, it is difficult to improve the smoothness of the upper surface of the second sub-recording film 4b. This results in a very high level of noise contained in the reproduction signal, causing a significant decrease in the C/N ratio. On the other hand, when the second sub-recording film 4b is formed of a material obtained by adding Al to Zn, the smoothness of the upper surface of the second sub-recording film 4b can be further increased. This makes it possible to decrease the noise level of the reproduction signal to increase the C/N ratio. Further, by forming the second sub-recording film 4b using the material obtained by adding Al to Zn, it is possible to fully improve the recording sensitivity of the recording layer. Additionally, since both Zn and Al are pollution-free materials, it is possible to minimize impact on a terrestrial environment, e.g. even if a used optical information recording medium 1 is buried in the earth for disposal. In this case, it is preferred to use a material having Al added in an amount not less than 1 at % and less than 50 at %, as the material for forming the second sub-recording film 4b. Further, to improve the smoothness of the upper surface of the second sub-recording film 4b, it is preferred to use a material having Al added in an amount not less than 9 at % and less than 50 at %. Moreover, to further improve the smoothness of the surface of the same, it is preferred to use a material having Al added in an amount not less than 16.5 at % and less than 50 at %. In the embodiment of the present invention, for example, the atomic percentage of Zn to the whole material for forming the second sub-recording film 4b is defined to be 75 at %, and that of Al, which is added, to the same is defined to be 25 at %.

As the thickness of the first sub-recording film 4a and that of the second sub-recording film 4b (the total thickness of the recording layer 4) are increased, the smoothness of the upper surface of the first sub-recording film 4a located closer to the incidence plane of the laser beam L is reduced to cause an increase in the noise level of the reproduction signal and degrade the recording sensitivity of the recording layer 4. In this case, when the thickness of the recording layer 4 exceeds 50 nm, the recording sensitivity thereof is so reduced that it can be difficult to use the medium 1 as the optical information recording medium. Meanwhile, when the total thickness of the recording layer 4 is less than 2 nm, the amount of change in optical characteristics of the recording layer 4 before and after recording of data thereon is decreased to decrease the C/N ratio, which makes it difficult to normally reproduce recorded data. Therefore, preferably, the total thickness of the recording layer 4 is defined to be not less than 2 nm and not more than 50 nm, and more preferably, it is defined to be not less than 2 nm and not more than 30 nm. It should be noted that in the optical information recording medium 1 according to the present embodiment, to further decrease the noise level of a reproduction signal and obtain the signal as one having a higher C/N ratio, the two sub-recording films 4a and 4b are formed such that the total thickness of the recording layer 4 is not less than 5 nm and not more than 15 nm.

Although the respective thicknesses of the sub-recording films 4a and 4b are not particularly limited, to fully improve the recording sensitivity of the recording layer 4, and at the same time sufficiently change the optical characteristics of the recording layer 4 before and after recording of data thereon, it is preferable to form the sub-recording films 4a and 4b such that each of them has a thickness not less than 2 nm and not more than 30 nm. Further, to more sufficiently change the optical characteristics of the recording layer 4 before and after recording of data thereon, it is preferable to define the respective thicknesses of the sub-recording films 4a and 4b such that the ratio between the thickness of the first sub-recording film 4a and that of the second sub-recording film 4b (thickness of the first sub-recording film 4a/thickness of the second sub-recording film 4b) is not less than 0.2 and not more than 5.0. In the embodiment of the present invention, the recording layer 4 is formed, for example, such that the total thickness thereof becomes equal to 10 nm by defining the thickness of the first sub-recording film 4a to be 5 nm, and that of the second sub-recording film 4b to be 5 nm.

The light transmitting layer 6 functions as an optical path of the laser beam when data is recorded or reproduced, and at the same time physically protects the recording layer 4 and the first dielectric layer 5a. The light transmitting layer 6 is formed of a resin material, such as a ultraviolet-curing resin or an electron beam-curing resin, such that it has a thickness not less than 1 µm and not more than 200 µm (preferably, not less than 50 µm and not more than 150 µm: e.g. 100 µm). In this case, when the light transmitting layer 6 has a thickness of less than 1 µm, it becomes difficult to protect the recording layer 4 and the first dielectric layer 5a, whereas when the light transmitting layer 6 has a thickness of more than 200 µm, it becomes difficult to form a light transmitting layer 6 whose parts (particularly, parts in the radial direction) have a uniform thickness. Further, when the thick light transmitting layer 6 is formed of a material different from the material for forming the substrate 2, warpage of the optical information recording medium 1 can be caused by thermal expansion, thermal shrinkage, or the like thereof. It should be noted that the method of forming the light transmitting layer 6 includes a method of applying a resin material (on the first dielectric layer 5a) by the spin coating method or the like, and then curing the same, a method of affixing a sheet material formed of a light-transmitting resin to the first dielectric layer 5a by an adhesive or the like. However, to prevent attenuation of the laser beam L, it is preferable to employ the spin coating method which does not add the adhesive layer in the medium 1.

When the optical information recording medium 1 is manufactured, first, a stamper for molding a substrate is set in a mold mounted to an injection molder. Then, the temperature of a polycarbonate resin, and the temperature of the mold are set to approximately 360 degree Celsius and approximately 120 degree Celsius, respectively, and at the same time, other molding conditions, such as a clamping force, a cooling time period, and the like, are set. The substrate 2 is formed by injection molding under these conditions. Then, the reflective layer 3 having a thickness of approximately 100 nm is formed on the upper surface of the substrate 2 by the vapor phase growth method (the vacuum deposition method, the sputtering method, or the like: in the present case, e.g. the sputtering method) using chemical species containing Ag as a main component. Next, the second dielectric layer 5b having a thickness of approximately 25 nm is formed by the vapor phase growth method using chemical species mainly composed of a mixture of ZnS and $SiO_2$ in a manner covering the reflective layer 3. Then, the second sub-recording film 4b having a thickness of approximately 5 nm is formed by the vapor phase growth method using a material (chemical species) containing Zn as a main component and having Al added thereto, in a manner covering the second dielectric layer 5b. When the second sub-recording film 4b is formed, a material is used which is obtained by adding Al, so that the upper surface of the second sub-recording film 4b is made even flatter or smoother (the smoothness of the upper surface of the second sub-recording film 4b is ensured), compared with a case where a material having no Al added thereto is used.

Then, the first sub-recording film 4a having a thickness of approximately 5 nm is formed by the vapor phase growth method using a material (chemical species) containing Si as a main component in a manner covering the second sub-recording film 4b. In forming the first sub-recording film 4a, since the upper surface of the second sub-recording film 4b is formed flat, the upper surface of the first sub-recording film 4a is also formed flat similarly to the upper surface of the second sub-recording film 4b. After that, the first dielectric layer 5a having a thickness of approximately 25 nm is formed by the vapor phase growth method using chemical species mainly composed of a mixture of ZnS and $SiO_2$, in a manner covering the first sub-recording film 4a. It should be noted that it is preferable to form the reflective layer 3, the second dielectric layer 5b, the second sub-recording film 4b, the first sub-recording film 4a, and the first dielectric layer 5a, sequentially on the substrate 2 by using a sputtering machine having a plurality of sputtering chambers, by adjusting layer-forming conditions on a chamber-by-chamber basis as required. Subsequently, the light transmitting layer 6 having a thickness of approximately 100 μm is formed on the first dielectric layer 5a by applying e.g. an acrylic-based ultraviolet-curing resin (or an epoxy-based ultraviolet-curing resin) in a manner covering the first dielectric layer 5a by the spin coating method, and then curing the same. In forming the light transmitting layer 6, conditions for spin coating (rotational speed, rate of change in the speed, a time period taken until the rotation is stopped, etc.) are adjusted, as required, so as to form the layer 6 such that it has a uniform thickness (particularly, in the radial direction). Further, to form a light transmitting layer 6 having a thickness of approximately 100 μm, it is preferable to use a resin material (ultraviolet-curing resin, in the present case) whose viscosity is high to some extent. Thus, the optical information recording medium 1 is completed.

Next, the principles of recording of record data by the optical information recording medium 1 will be described with reference to drawings.

First, the laser beam L adjusted to a recording power (e.g. of approximately 5.0 mW at the upper surface of the light transmitting layer 6), having a wavelength (λ) of 405 nm, is emitted from an objective lens having a numerical aperture (NA) of 0.85, and irradiated onto the optical information recording medium 1. At this time, in an area of the recording layer 4 to which the laser beam L is irradiated, an element (Si, in the present case), which is the main component of the first sub-recording film 4a, and an element (Zn, in the present case), which is the main component of the second sub-recording film 4b, are mixed with each other, to form a recorded portion M shown in FIG. 1. In this case, the portion remaining in the state of the first sub-recording film 4a and the second sub-recording film 4b being layered (hereinafter also referred to as the "layered portion"), and the recorded portion M are largely different in optical characteristics. Hence, when the laser beam L adjusted to a reproduction power is irradiated to the layered portion and the recorded portion M, respective values of reflectance exhibited by the two kinds of portions are very different from each other. Therefore, by detecting the difference in the reflectance, it is determined whether or not the recorded portion M exists, and based on the determination, the recording/reproducing apparatus reproduces (reads) record data.

In the present optical information recording medium 1, the recording layer 4 is sandwiched by the first dielectric layer 5a and the second dielectric layer 5b, and hence even when the first sub-recording film 4a and the second sub-recording film 4b are heated by the irradiation of the laser beam L to the extent that they are mixed with each other, it is possible to prevent thermal deformations of the substrate 2 and the light transmitting layer 6. This makes it possible to prevent a rise in the noise level, a decrease in the C/N ratio, and deterioration of jitter characteristics. Furthermore, since the first sub-recording film 4a is made of a material containing Si as a main component, and the second sub-recording film 4b is made of a material containing Zn as a main component, it is possible to sufficiently change the optical characteristics of a portion of the recording layer 4, which is formed into the recorded portion M, before and after recording of record data thereon. As a result, it can be positively detected whether or not the recorded portion M exists, thereby making it possible to reliably reproduce record data.

Figure 2:
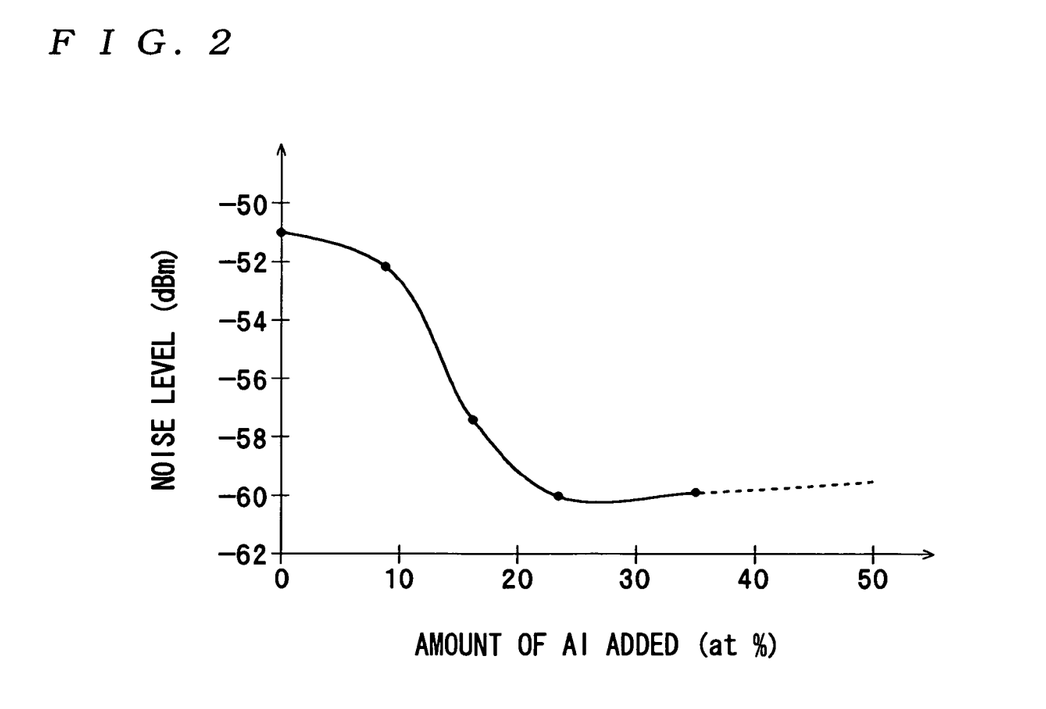
FIG. 2 is a characteristics diagram showing the relationship between the amount of Al added to a material for forming a second sub-recording film, and the noise level of a reproduction signal.

Next, the relationship between the amount of Al added to a material (material containing Zn as the main component) for forming the second sub-recording film 4b, and the noise level will be described with reference to FIGS. 2 and 3.

As described hereinbefore, if Al is added to the material (material containing Zn as the main component) for forming the second sub-recording film 4b, it is possible to improve the smoothness of the upper surface of the second sub-recording film 4b formed by the vapor phase growth method. Therefore, it is possible to decrease the level of noise contained in the reproduction signal (noise level of the reproduction signal). In this case, the present inventors have confirmed that the noise level at least in a frequency band of 4.1 MHz to 16.5 MHz is reduced by addition of Al. More specifically, as shown in FIG. 2, when Al is not added to the material for forming the second sub-recording film 4b, which contains Zn as the main component (when Al is added in an amount of 0 at %), the noise level (for example, the noise level in the vicinity of 4.2 MHz was measured, while rotating the optical information recording medium 1 at a linear velocity of 5.3 m/s) of the reproduction signal is −51.0 dBm. In contrast, when Al is added to the material containing Zn as the main component in an amount of 9 at %, the noise level is lowered to −52.1 dBm. Further, when Al is added in amounts of 16.3 at %, 23.5 at %, and 35.1 at %, the noise level lowered to −57.4 dBm, −60.0 dBm, and −59.8 dBm, respectively. As to the lowering of the noise level, even when Al is added up to a little less than 50.0 at % (less than 50.0 at %), it is considered that the noise level is also lowered to −58 dBm or lower.

Therefore, by adding Al in an amount not less than 9 at % and less than 50 at % to a material containing Zn as a main component, it is possible to lower the noise level to approximately −52 dBm. Further, by adding Al in an amount not less than 16.5 at % and less than 50 at % to the material containing Zn as the main component, it is possible to lower the noise level to approximately −57 dBm. Therefore, by forming the second sub-recording film 4b using the material containing Zn as the main component and having Al added thereto in an amount not less than 9 at % and less than 50 at %, it is possible to manufacture the optical information recording medium which is capable of normally reproducing record data (generating the reproduction signal reduced in noise level). Further, by defining the amount of Al to be added as not less than 16.5 at % and less than 50 at %, it is possible to further lower the noise level. It should be noted that as shown in FIG. 2, insofar as the amount of Al added is not more than approximately 24 at %, the noise level is still more markedly reduced, as Al is added in larger amounts. However, after the added amount of Al exceeds approximately 24 at %, the amount of lowering of the noise level becomes slight even though the added amount of Al is further increased. Therefore, by adding Al in an amount not less than 9 at % and not more than 24 at % (more preferably not less than 16.5 at % and not more than 24 at %) to a material containing Zn as a main component, it is possible to sufficiently lower the noise level of the reproduction signal in a frequency band which is of interest in the use of the present optical recording medium.

Next, a description will be given of the relationship between the thickness (layer thickness) of the recording layer 4 and the C/N ratio with reference to FIG. 3.

As describe above, by reducing the layer thickness of the recording layer 4 (the sum of the thickness of the first sub-recording film 4a and the thickness of the second sub-recording film 4b), it is possible to enhance the smoothness of the upper surfaces of the first and second sub-recording films 4a and 4b, thereby making it possible to increase the C/N ratio. However, when the layer thickness of the recording layer 4 is too small, the amount of change in optical characteristics of the recording layer 4 before and after recording of data thereon becomes too small, causing a reduced C/N ratio. This makes it difficult to normally reproduce record data. On the other hand, when the layer thickness of the recording layer 4 is too large, a crack can be produced in the optical information recording medium 1 due to stress within the first and second sub-recording films 4a and 4b, and the smoothness of the upper surfaces of the first and second sub-recording films 4a and 4b is reduced to increase the noise level, which results in the reduced C/N ratio. Further, when the layer thickness of the recording layer 4 is too large, the recording sensitivity of the recording layer 4 can be lowered. To avoid the above inconveniences, it is required to define the layer thickness of the recording layer 4 in view of the aforementioned circumstances.

Figure 3:
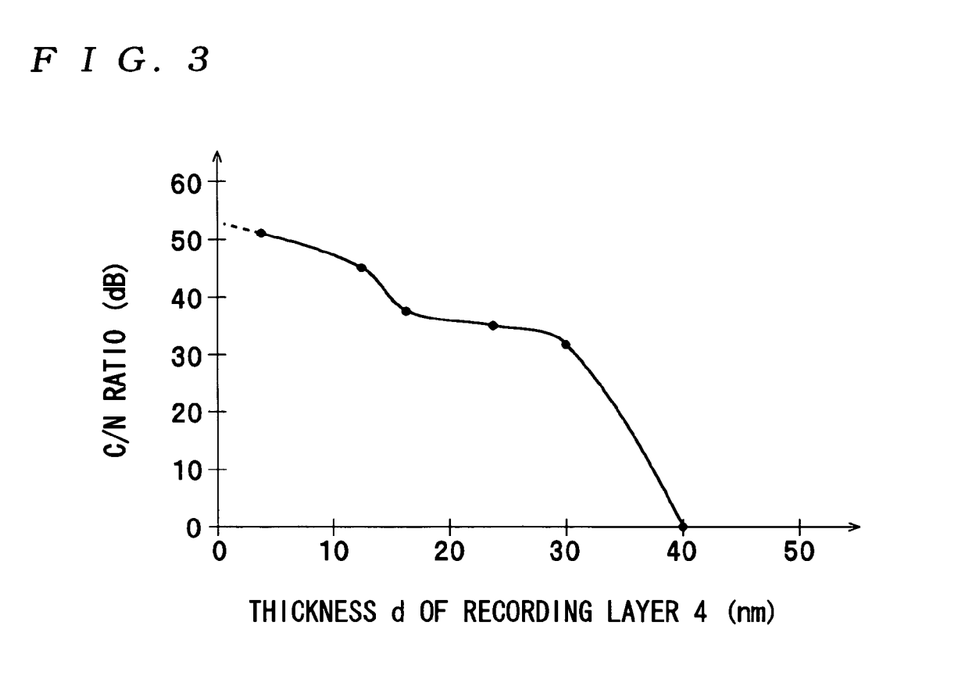
FIG. 3 is a characteristic diagram showing the relationship between the thickness of the recording layer (layer thickness) and the C/N ratio of the reproduction signal.

More specifically, as shown in FIG. 3, when the layer thickness of the recording layer 4 is more than 30 nm, the C/N ratio becomes lower than 31 dB to make it difficult to normally reproduce record data, whereas when the layer thickness of the recording layer 4 is not more than 30 nm, the C/N ratio becomes not less than 31 dB, which makes it possible to perform reliable reproduction of record data. Further, when the layer thickness of the recording layer 4 is not more than 24 nm, the C/N ratio becomes not less than 35 dB, and when the same is not more than 12 nm, the C/N ratio becomes not less than 45 dB, which makes it possible to perform more reliable reproduction of record data. In this case, however, when the layer thickness of the recording layer 4 is less than 2 nm, the optical characteristics of the recording layer 4 are hardly changed between before and after recording of data on the recording layer 4, so that it difficult to perform normal reproduction of record data. Further, when the layer thickness of the recording layer 4 is more than 30 nm, the smoothness of the upper surfaces of the first and second sub-recording films 4a and 4b is reduced, resulting in the increased noise level. Furthermore, when the layer thickness of the recording layer 4 is more than 30 nm, a crack is produced in the recording layer 4 due to the stresses within the first and second sub-recording films 4a and 4b, when the optical information recording medium 1 is heated or cooled, or when a force for bending the medium 1 is applied to the medium 1. Additionally, it has also been confirmed that when the layer thickness of the recording layer 4 is more than 30 nm, the recording sensitivity of the recording layer 4 is reduced.

Therefore, to reliably reproduce record data while preventing production of a crack and reduction of the recording sensitivity, it is preferable to form the first sub-recording film 4a and the second sub-recording film 4b such that the layer thickness of the recording layer 4 is not less than 2 nm and not more than 30 nm. Further, to more reliably reproduce record data by improving the C/N ratio, it is preferable to form the first sub-recording film 4a and the second sub-recording film 4b such that the layer thickness of the recording layer 4 is not less than 2 nm and not more than 24 nm (more preferably, not less than 2 nm and not more than 12 nm).

As described hereinabove, according to the optical information recording medium 1, the first sub-recording film 4a is formed by using a material containing Si as a main component, and the second sub-recording film 4b is formed in the vicinity of the first sub-recording film 4a by using a material containing Zn as a main component and having Al added thereto. The addition of Al makes it possible to improve the smoothness of the upper surface of the second sub-recording film 4b, thereby considerably lowering the noise level. Therefore, the C/N ratio can be enhanced, whereby record data can be reliably reproduced.

According to the optical information recording medium 1, the second sub-recording film 4b is formed by using the material having Al added thereto in an amount not less than 9 at % and less than 50 at %, whereby it is possible to decrease the noise level to approximately −52 dBm or lower.

This makes it possible to provide the optical information recording medium 1 capable of reliably reproducing record data.

Furthermore, according to the optical information recording medium 1, the second sub-recording film 4b is formed by using the material having Al added thereto in an amount not less than 16.5 at % and less than 50 at %, whereby it is possible to decrease the noise level to approximately −57 dBm or lower. As a result, it is possible to more reliably reproduce record data.

Further, according to the optical information recording medium 1, the recording layer 4 is constructed by forming the first sub-recording film 4a and the second sub-recording film 4b such that they are in contact with each other, whereby when the laser beam L adjusted to the recording power is irradiated to the recording layer, the first sub-recording film 4a and the second sub-recording film 4b can be easily mixed with each other to thereby form the recorded portion M.

Further, according to the present optical information recording medium 1, since the total of the thickness of the first sub-recording film 4a and that of the second sub-recording film 4b is defined to be not less than 2 nm and not more than 30 nm, it is possible to fully improve the C/N ratio, which enables record data to be more reliably reproduced.

Moreover, according to the present optical information recording medium 1, the recording layer 4 is configured to be sandwiched between the first dielectric layer 5a and the second dielectric layer 5b, it is possible to prevent thermal deformations of the substrate 2 and the light transmitting layer 6 during irradiation of the laser beam L (during formation of the recorded portion M). Further, since corrosion of the recording layer 4 can be prevented, it is possible to store recorded data for a long time period in a manner such that the recorded data can be normally reproduced.

Furthermore, according to the optical information recording medium 1, the reflective layer 3 is formed between the substrate 2 and the second dielectric layer 5b, whereby the effect of multi-beam interference is further increased. This makes it possible to further increase the difference in optical reflectance between the recorded portion M and the unrecorded portion, whereby it is possible to more reliably reproduce record data.

It should be noted that the present invention is by no means limited to the aforementioned embodiment. For example, although in the above-described embodiment, the description has been given of the examples in which the first sub-recording film 4a and the second sub-recording film 4b are arranged adjacent to each other in the direction of thickness of the optical information recording medium 1, this is not limitative, but the construction of the recording layer 4 can be changed as required, so long as it is configured to be capable of forming an area for mixing the first sub-recording film 4a and the second sub-recording film 4b with each other, when the laser beam L adjusted to the recording power is irradiated to the recording layer 4. More specifically, for example, the recording layer 4 can also be formed by interposing one or more very thin dielectric layers or the like between the first sub-recording film 4a and the second sub-recording film 4b, or alternatively it can be formed by interposing a layer made of a mixture of materials for forming the first sub-recording film 4a and the second sub-recording film 4b, between the sub-recording films 4a and 4b. Further, although in the above-described embodiment, the description has been given, by way of example, of the optical information recording medium 1 which includes the recording layer 4 comprised of two recording films, i.e. the first sub-recording film 4a and the second sub-recording film 4b, this is not limitative, but the recording layer according to the present invention can be configured to have not only the sub-recording films 4a and 4b but also one or more sub-recording films which are formed of a material mainly composed of an element selected from the group consisting of Si, Ge, C, Sn, Zn, and Cu.

Further, although in the above-described embodiment, the description has been given of the optical information recording medium 1 which has the first sub-recording film 4a corresponding to the first recording film in the present invention formed toward i.e. closer to the light transmitting layer 6, and the second sub-recording film 4b corresponding to the second recording film in the present invention formed toward i.e. closer to the substrate 2, this is not limitative, but it is possible to employ the construction in which the first sub-recording film 4a is formed toward i.e. closer to the substrate 2 and the second sub-recording film 4b is formed toward i.e. closer to the light transmitting layer 6. Further, although in the above-described embodiment, the description has been given of the optical information recording medium 1, including the first dielectric layer 5a and the second dielectric layer 5b, this is not limitative, but the optical information recording medium according to the present invention encompasses optical information recording media which do not have one or any of the first dielectric layer 5a and the second dielectric layer 5b. Furthermore, although in the above-described embodiment, the description has been given of the optical information recording medium 1, including the reflective layer 3, this is not limitative, but the optical information recording medium according to the present invention encompasses optical information recording media which do not have the reflective layer 3. Furthermore, although in the above-described embodiment, the thicknesses of the respective layers are described only by way of examples, and this is not limitative, but of course they can be changed as required.

What is claimed is:

1. An optical information recording medium for recording and reproducing record data, comprising:
   a substrate;
   a recording layer formed on the substrate, for having a laser beam irradiated thereto for recording and reproducing the record data; and
   a light transmitting layer formed in a manner covering the recording layer,
   wherein the recording layer includes a first recording film formed of a first material containing Si as a main component, and a second recording film formed of a second material containing Zn as a main component and having Al added thereto, the second recording film being formed in the vicinity of the first recording film,
   wherein the laser beam is irradiated to the recording layer from a light transmitting layer side, and
   wherein the second material has Al added thereto in an amount not less than 16.5 at % and less than 50 at %.

2. An optical information recording medium as claimed in claim 1, wherein the recording layer is configured such that the first and second recording films are in contact with each other.

3. An optical information recording medium as claimed in claim 1, wherein the recording layer is formed such that a total of a thickness of the first recording film and a thickness of the second recording film is not less than 2 nm and not more than 30 nm.

4. An optical information recording medium as claimed in claim 1, including a first dielectric layer formed between the light transmitting layer and the recording layer, and a second dielectric layer formed between the substrate and the recording layer.

5. An optical information recording medium as claimed in claim 4, including a reflective layer formed between the substrate and the second dielectric layer.

* * * * *